Nov. 20, 1951  E. WILLIAMS ET AL  2,575,646
INJECTOR APPARATUS

Filed May 1, 1950  2 SHEETS—SHEET 2

UNITED STATES PATENT OFFICE 2,575,646

INJECTOR APPARATUS

Ernest Williams and Bruce Whitehead, Tunbridge Wells, and John Percy Mercer, Tonbridge, England, assignors to E. C. D. Limited, Tonbridge, England, a company of Great Britain Application May 1, 1950, Serial No. 159,158
In Great Britain May 10, 1949

8 Claims. (Cl. 103—37)

This invention relates to injector apparatus and more particularly to control apparatus for use in the control of pumps for adding measured proportions of one substance to another. Such apparatus is often required for a variety of purposes for example for adding chlorine to water, for adding certain so-called inhibiting chemicals to oil in oil refining and for adding certain component fluids to other fluids in scent making. In these and other cases it is required to add certain substances to others so as always to maintain predetermined proportions of the added substances to those to which they are added.

It is common practice in injector apparatus of this nature to inject a substance to be added by means of a variable injector device, such, for example, as a variable-throw pump, the delivery of which is automatically governed in dependence upon the rate of flow of the main substance to which the addition is to be made. In general there is provided a device responsive to the rate of flow of the main substance—e. g. a venturi or pressure head—which controls a pressure or vacuum cylinder, bellows, or the like, which in turn controls directly or indirectly the throw of the injector pump or produces an equivalent control on the rate of delivery of the added liquid.

This invention relates to injector automatic control apparatus of the kind in which a variable delivery device is automatically controlled to vary its rate of delivery as a function of the rate of flow of a main substance to which said device is required to make addition. The invention has for its object to provide improved automatic control apparatus of this kind which shall be simple and cheap to make, easy to adjust, economical to maintain and capable of being operated and adjusted satisfactorily by relatively unskilled labour such as native labour.

Figure 1:
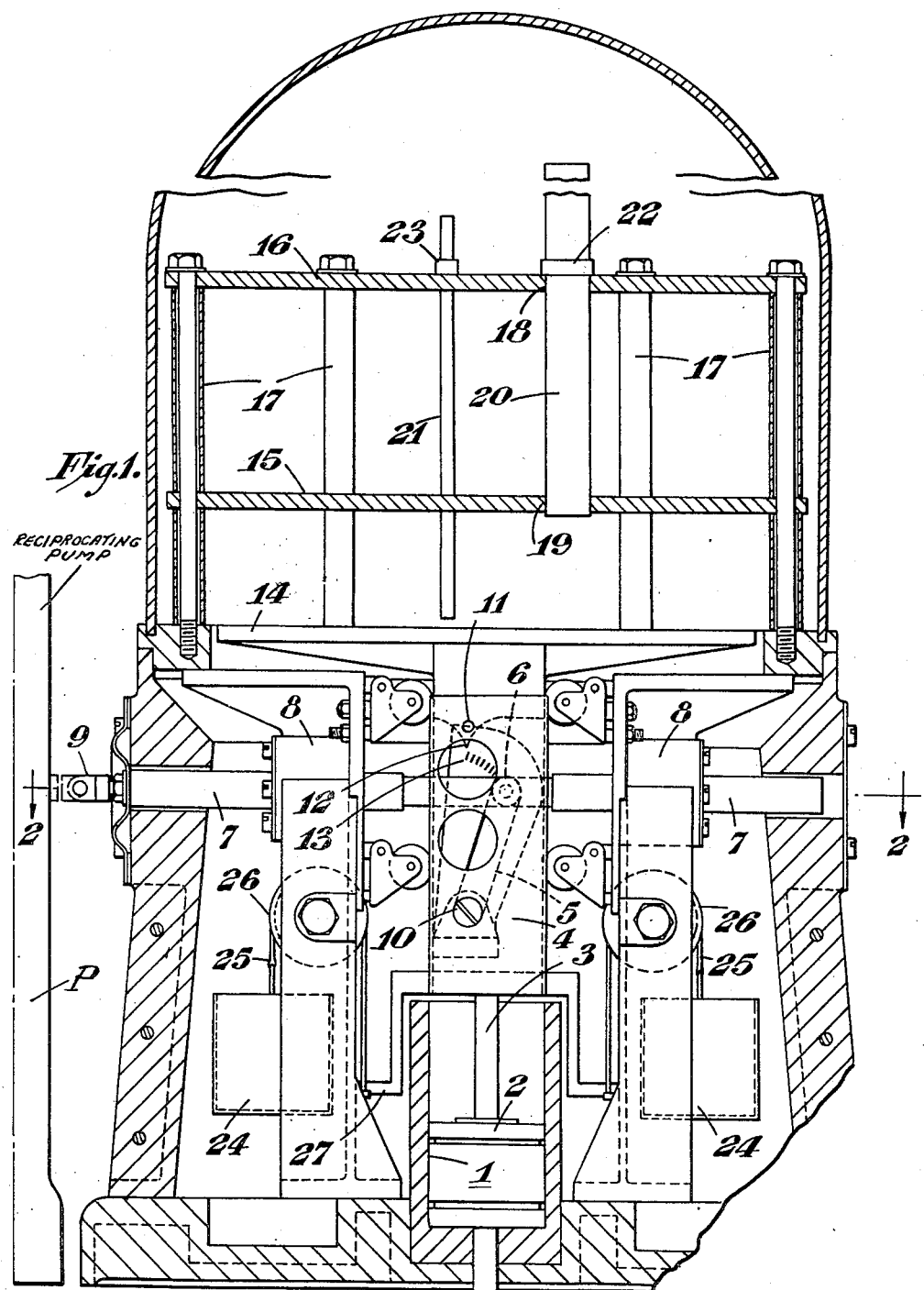
Figure 2:
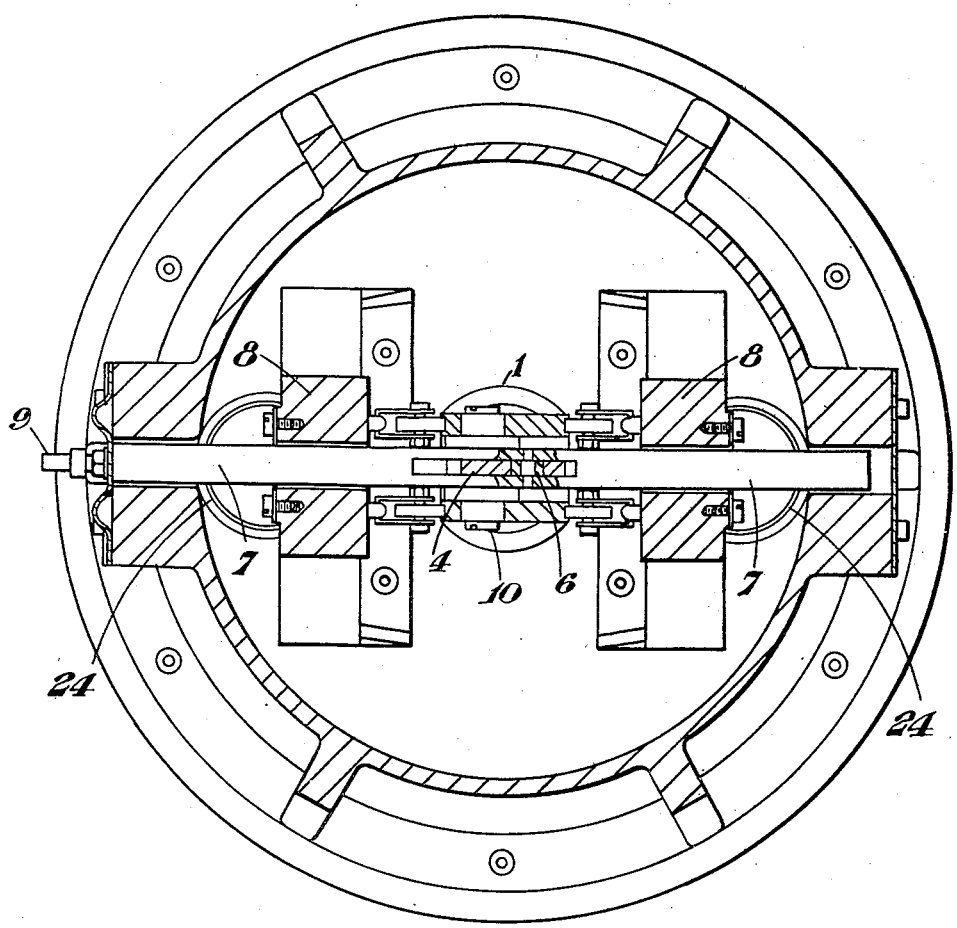

The invention is illustrated in the accompanying drawings in which Fig. 1 is a sectional elevation through the unit in association with a fragment of a reciprocating pump in elevation, and Fig. 2 is a sectional plan on the line 2—2 of Fig. 1 of one embodiment.

Referring to the drawings these show a simple automatic control unit for controlling a variable throw diaphragm or other reciprocating pump P as well known per se which injects chlorinated fluid into a water main (not shown) under the control of the flow in said main. The control unit comprises a control device in the form of a pressure cylinder 1 and piston 2. The cylinder 1 is subjected through a pipe 1ᵃ to pressure derived from the water main from a restriction (not shown) therein so that the greater the rate of water flow the greater the pressure in the cylinder. The said cylinder is mounted with its length vertical and contains the piston 2 which is moved vertically upwards by pressure in the cylinder. On the piston rod 3 is a cam plate 4 in which is a slot 5 in which is slidably mounted an operating rod bearing 6 which is carried by an operating rod 7 which is slidable endwise in bearings 8 and which controls the throw of the pump. The control may be effected directly by connecting the throw-varying lever (not shown) of the pump to the coupling 9 on the end of the rod 7 or any suitable electrical or hydraulic or other servo or relay mechanism as well known per se may be interposed between the coupling 9 and the throw-varying lever of the pump. As will be apparent, as the cam plate 4 is moved up and down by the piston rod 3 it moves the rod 7 endwise thus varying the stroke of the pump. The cam plate 4 is pivoted at 10 so that the angle of the cam slot 5 with respect to the axis of the piston rod can be adjusted and the total movement of the rod 7 thus adjusted. A grub screw at 11 locks the plate 4 in the chosen adjustment and a pointer 12 in conjunction with a scale 13 indicates the adjustment chosen. Also mounted on the piston rod 3 above the operating rod 7 is a striker disc 14 which is fixed on the rod at right angles thereto and may, if desired, be arranged to be adjustable in position along it. As shown the disc 14 is not adjustable. Above the striker disc are two fixed discs 15, 16 which are parallel to one another and to the striker disc and are held in fixed relationship by bolts and spacers at 17. These discs 15, 16 are provided with a corresponding number of holes so arranged that each hole in one fixed disc is vertically in line with one in the other. Only two of these holes, 18, 19, one in each disc appear in Fig. 1, but it will be understood that there are several, of different sizes, in each disc. Weights such as 20, 21 in the form of rods of different lengths and with enlarged heads or collars 22, 23 are loosely fitted in the holes in the fixed discs, the heads or collars being too large to pass the holes. Each weight has its head above the upper fixed disc and projects down through two aligned holes, one in each fixed disc, below the lower fixed disc. The extent of the downward projection of the various weights varies from weight to weight so that, as the piston moves upwards the striker disc will first lift one weight and then two and then three . . . and so on. In Fig. 1 only two of these weights are shown and it will be apparent that, as the disc 14 rises, weight 21 will be lifted well before weight 20.

Clearly, by suitably selecting the weights and extents of downward projections any desired law connecting gravity restoring force (provided by the weights) and vertical movement of the piston 2 (which is a function of rate of water flow) can be obtained and accordingly any desired law connecting rate of injection with rate of water flow can be obtained.

In the illustrated construction the weight of the piston 2, piston rod 3 and striker disc 14 is balanced by counterbalancing weights 24 attached through wires 25 running over pulleys 26, to a bridge piece 27 forming part of the piston rod structure.

The main advantage of the invention lies in its mechanical simplicity and reliability. Mathematically complex laws can be readily satisfied without the use of springs requiring careful adjustment and maintenance and without the use of expensive and awkward cam shapes. Moreover, maintenance is easy, and does not require highly skilled labour. In addition troubles due to mechanical friction are so reduced as to be negligible since the weights such as 20 and 21 are quite loose fitting and have merely to be guided as they lift.

We claim:

1. In an injector apparatus of the kind in which a variable delivery device is automatically controlled to vary its rate of delivery as a function of the rate of flow of a main substance to which said device is required to make addition, a control device comprising a pressure responsive member responsive to pressure developed in dependence upon said rate of flow of said main substance, an upwardly movable member connected to said pressure responsive member to be moved upwards thereby, a plurality of separate exchangeable weights in the upwards path of said upwardly movable member and positioned to be sequentially engaged thereby, and a control operating member driven by said upwardly movable member for automatically controlling said delivery device.

2. In an injector apparatus of the kind in which a variable delivery device is automatically controlled to vary its rate of delivery as a function of the rate of flow of a main substance to which said device is required to make addition, a control device comprising a pressure responsive member responsive to pressure developed in dependence upon said rate of flow of said main substance, an upwardly movable member connected to said pressure responsive member to be moved upwards thereby, a plurality of separate exchangeable weights in the form of vertical rods each freely mounted for vertical movement above a datum position, said rods being mounted with their lower ends in the upwards path of said upwardly movable member and positioned to be sequentially engaged thereby, and a control operating member driven by said upwardly movable member for automatically controlling said delivery device.

3. Apparatus as claimed in claim 2 wherein the rods are carried in a carrier frame comprising two horizontal vertically spaced frame members with vertically aligned holes in which said rods are loosely mounted, each rod having an enlargement of greater diameter than the upper of the two holes in which it is mounted.

4. In an injector apparatus of the kind in which a variable delivery device is automatically controlled to vary its rate of delivery as a function of the rate of flow of a main substance to which said device is required to make addition, a control device comprising a pressure responsive member responsive to pressure developed in dependence upon said rate of flow of said main substance, an upwardly movable member connected to said pressure responsive member to be moved upwards thereby, a plurality of separate exchangeable weights in the upwards path of said upwardly movable member and positioned to be sequentially engaged thereby, and a control operating member driven by said upwardly movable member for automatically controlling said delivery device said upwardly moving member having an inclined cam slot in which is a bearing carried by said control member which is mounted to be movable endwise and horizontally.

5. In an injector apparatus of the kind in which a variable delivery device is automatically controlled to vary its rate of delivery as a function of the rate of flow of a main substance to which said device is required to make addition, a control device comprising a pressure responsive member responsive to pressure developed in dependence upon said rate of flow of said main substance, an upwardly movable member connected to said pressure responsive member to be moved upwards thereby, a plurality of separate exchangeable weights in the form of vertical rods each freely mounted for vertical movement above a datum position, said rods being mounted with their lower ends in the upwards path of said upwardly movable member and positioned to be sequentially engaged thereby, and a control operating member driven by said upwardly movable member for automatically controlling said delivery device said upwardly moving member having an inclined cam slot in which is a bearing carried by said control member which is mounted to be movable endwise and horizontally.

6. Apparatus as claimed in claim 4 wherein the inclination of the cam slot is adjustable.

7. Apparatus as claimed in claim 5 wherein the inclination of the cam slot is adjustable.

8. Apparatus as claimed in claim 2 wherein the rods are carried in a carrier frame comprising two horizontal vertically spaced frame members constituted by fixed horizontal discs with vertically aligned holes in which said rods are loosely mounted, each rod having an enlargement of greater diameter than the upper of the two holes in which it is mounted said upwardly movable member comprising a horizontal disc for sequentially engaging the lower ends of said rods.

ERNEST WILLIAMS.
BRUCE WHITEHEAD.
JOHN PERCY MERCER.

No references cited.